United States Patent
Weiss

(10) Patent No.: US 7,655,767 B2
(45) Date of Patent: Feb. 2, 2010

(54) USE OF THIAZOLYL-PYRIDINIUM BASED DYES IN OPTICAL LAYERS FOR OPTICAL DATA RECORDING

(75) Inventor: Andre Weiss, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 11/661,885

(22) PCT Filed: Aug. 31, 2005

(86) PCT No.: PCT/EP2005/054270

§ 371 (c)(1),
(2), (4) Date: Mar. 1, 2007

(87) PCT Pub. No.: WO2006/024642

PCT Pub. Date: Mar. 9, 2006

(65) Prior Publication Data

US 2008/0108799 A1    May 8, 2008

(30) Foreign Application Priority Data

Sep. 2, 2004    (EP) .................................. 04020850

(51) Int. Cl.
- C09B 44/00 (2006.01)
- C09B 57/00 (2006.01)
- G11B 7/24 (2006.01)

(52) U.S. Cl. ................. 534/707; 546/270.1; 546/270.4; 430/270.15; 430/270.16; 430/945

(58) Field of Classification Search ........................ None
See application file for complete search history.

(56) References Cited

U.S. PATENT DOCUMENTS

| 3,551,436 A | 12/1970 | Bauer et al. |
| 3,551,437 A | 12/1970 | Bauer et al. |
| 3,555,036 A | 1/1971 | Bauer et al. |

(Continued)

FOREIGN PATENT DOCUMENTS

| DE | 1795369 | 1/1972 |
| DE | 19753025 | 5/1999 |
| DE | 10109243 | 9/2002 |

(Continued)

OTHER PUBLICATIONS

Zarins et al., Chemical Abstracts, 80:95805, 1974.*
English Translation of JP 2003-063139, Mar. 5, 2003.*
PCT International Search Report for PCT/EP2005/054270, Nov. 8, 2005.

(Continued)

*Primary Examiner*—Fiona T Powers
(74) *Attorney, Agent, or Firm*—Anthony A. Bisulca

(57) ABSTRACT

The present invention relates to the use of thiazolyl-pyridinium based dyes in optical layers for optical data recording, preferably for optical data recording using a laser with a wavelength up to 450 nm.

The invention further relates to a write only read many (WORM) type optical data recording medium capable of recording and reproducing information with radiation of blue laser, which employs a thiazolyl-pyridinium based type dye in the optical layer.

The present invention further relates to new thiazolyl-pyridinium based dyes, of formula (V), (VI) or (VIII).

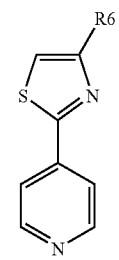

(V)

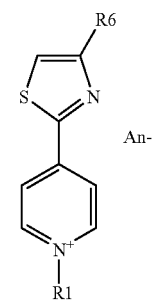

(VI)

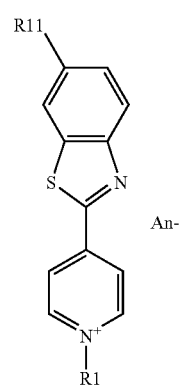

(VIII)

20 Claims, No Drawings

U.S. PATENT DOCUMENTS

| | | | |
|---|---|---|---|
| 3,703,577 A | | 11/1972 | Bauer et al. |
| 4,528,291 A | * | 7/1985 | Witkowski et al. .......... 514/301 |
| 4,571,402 A | * | 2/1986 | Sunday et al. .............. 514/336 |
| 4,900,648 A | | 2/1990 | Hioki et al. |
| 5,144,333 A | | 9/1992 | Mizuguchi et al. |

FOREIGN PATENT DOCUMENTS

| | | | |
|---|---|---|---|
| EP | 0353393 | | 2/1990 |
| EP | 401791 | | 12/1990 |
| GB | 875887 | * | 8/1961 |
| JP | 2003-063139 | * | 3/2003 |

OTHER PUBLICATIONS

PCT Written Opinion of the International Searching Authority for PCT/EP2005/054270, mailed Nov. 18, 2005.

Savarino et al. "Spectral Behaviour of Linked Heterocyclic Systems & Related Dyes," Spectrochimica Acta, vol. 49A, No. 9, pp. 1379-1393; (1993).

Barnic et al. "Quaternary Salts from 2-(methylpyridyl or Quinolyl)benz—X-azoles and Related Polymethine dyes(1)" J. Heterocyclic Chem., vol. 15, pp. 17-21; (1978).

Wallenfels et al. "Freie Radikale ALS Reduktionsprodukte Von Pyridiniumsalzen," Justus Liebigs Ann. Chem. Bd. 621 pp. 198-214; Nov. 20, 1958.

Kerr et al., "Quaternary Salt Formation of Substituted Oxazoles and Thiazoles," J. Am. Chem Soc. vol. 82 pp. 186-189; (1960).

English Abstract of JP 04-025493, Jan. 29, 1992.

* cited by examiner

USE OF THIAZOLYL-PYRIDINIUM BASED DYES IN OPTICAL LAYERS FOR OPTICAL DATA RECORDING

The present invention relates to the use of thiazolyl-pyridinium based dyes in optical layers for optical data recording, preferably for optical data recording using a laser with a wavelength up to 450 nm.

The invention further relates to a write only read many (WORM) type optical recording medium capable of recording and reproducing information with radiation of blue laser, which employs a thiazolyl-pyridinium based dye in the optical layer.

The present invention further relates to new thiazolyl-pyridinium based dye compounds.

Recently, organic dyes have attracted considerable attentions in the field of diode-laser optical storage. Commercial recordable compact discs (CD-R) and recordable digital versatile discs (DVD-R) can contain, as recording layer, numerous dyes based on phthalocyanine, hemicyanine, cyanine and metallized azo structures. These dyes are suitable in their respective fields with the laser wavelength criteria. Other general requirements for dye media are strong absorption, high reflectance, high recording sensitivity, low thermal conductivity as well as light and thermal stabilities, durability for storage or non-toxicity.

For industrial application, these dyes have to be suitable for the spin coating process to prepare thin films, i.e. they have to be sufficiently soluble in the organic solvents generally applied in the spin coating process.

WORM (write once read many) type and erasable type optical recording media reproduce information by detecting variations in the reflectivity caused by physical deformation, by alterations of optical characteristics as well as by phase and magnetic properties of a recording layer before and after the recording.

Recordable compact discs (CD-R) are widely known as a WORM type optical recording medium. Recently, digital versatile discs (DVD) with increased information storage capabilities up to 4.7 GBytes have been commercialized.

The DVD-R technology adopts as a light source a red diode laser with a wavelength of 630-670 nm. Thereby the pit size and track interval can be reduced, increasing the information storage capacity by up to 6-8 times compared to CD-R's.

Blu-ray® discs (Blu-ray® disc is a standard developed by Hitachi Ltd., LG Electronics Inc., Matsushita Electric Industrial Co. Ltd., Pioneer Corporation, Royal Philips Electronics, Samsung Electronics Co. Ltd., Sharp Corporation, Sony Corporation, Thomson Multimedia) are going to be the next milestone in optical recording technology. Its new specification increases the data storage up to 27 GBytes per recording layer for a 12 cm diameter disc. By adopting a blue diode laser with a wavelength of 405 nm (GaN or SHG laser diodes), the pit size and track interval can be further reduced, again increasing the storage capacity by an order of magnitude.

The construction of optical data recording media is known in the art. An optical data recording media generally comprises a substrate and a recording layer, the optical layer. Usually discs or wavers of organic polymeric materials are used as substrates. Preferred substrates are polycarbonate (PC) or polymethylmethacrylate (PMMA). The substrate has to provide an even and uniform surface of high optical quality. The optical layer is deposited thereon in a thin and uniform film of high optical quality and defined thickness. Finally, a reflective layer, e.g. aluminium, gold or copper, is deposited upon the optical layer.

Advanced optical data recording media may comprise further layers, such as protective layers, adhesive layers or additional optical layers.

To provide for a thin and uniform film of the optical layer, the material is usually deposited by spin coating, vacuum evaporation, jet coating, rolling coating or soaking. The preferred process in industry is spin coating to form an optical layer of about 70 nm to 250 nm thickness. For the application in the spin coating process, the material of the optical layer has to be highly soluble in organic solvents.

DE 1795369 and U.S. Pat. No. 3,703,577 (American Cyanamid Company) disclose compounds of the following formula, in particular thiazolyl-pyridinium salts and oxazolyl-pyridinium salts, their synthesis and the use of these compounds for the lowering of blood glucose levels in warm blooded animals.

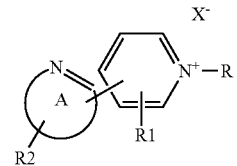

U.S. Pat. No. 4,571,402 (Schering Corporation) discloses 2-(4'-pyridinyl)-thiazole derivatives, in particular carboxylates, carboxamides and thiocarboxamides, their preparation and their use as bronchodilating agents.

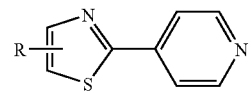

Kerr et al. (J. Am. Chem. Soc. 82, 1960, 186) describe the salt formation of substituted oxazoles and thiazoles.

Wallenfels et al. (Justus Liebigs Ann. Chem. 621, 1959, 198) describe the synthesis of 1-(2,6-dichlorobenzyl)-4-[thiazolyl(2)]-pyridinium bromides.

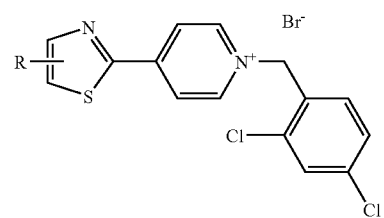

Surprisingly it has been found, that thiazolyl-pyridinium based dyes as described below are useful as dye compounds in optical layers for optical data recording media.

The present invention therefore relates to the use of thiazolyl-pyridinium based dyes in an optical layer comprising thiazolyl-pyridinium based dyes as described below and to the use of said optical layers for optical data recording media.

More particularly, the invention relates to a write once read many (WORM) type optical data recording medium capable of recording and reproducing information with radiation of blue laser of preferably 405 nm, which employs a thiazolyl-pyridinium based dye in the optical layer The invention further relates to new thiazolyl-pyridinium based dye compounds.

The present invention is directed to an optical layer comprising at least one dye compound of formulae (I) or (II)

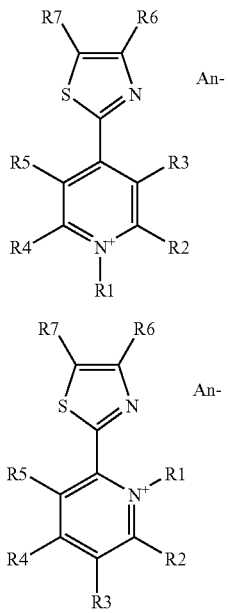

wherein
$R_1$ represents a represents a linear or branched $C_{1-2}$ alkyl,
$R_2$ to $R_5$ independently of one another, represent hydrogen, cyano (—CN), halogen, nitro ($NO_2$), hydroxy, $C_{1-8}$ alkoxy (—OR) wherein the alkyl (R) can be unsubstituted or substituted by $C_{1-8}$ alkyl, hydroxy (—OH), by $CH_{6-12}$ aryl or by —$NR_8R_9$ in which $R_8$ and $R_9$ are independently hydrogen, $C_{1-8}$ alkyl or $C_{6-12}$ aryl;
  $C_{1-8}$ alkyl, wherein the alkyl can be unsubstituted or substituted by $C_{1-8}$ alkyl, hydroxy (—OH), by $CH_{6-12}$ aryl or by —$NR_8R_9$ in which $R_8$ and $R_9$ are independently hydrogen, $C_{1-8}$ alkyl or $C_{6-12}$ aryl;
  $CX_3$ where X can be chlorine, fluorine, bromine;
  $C_{1-8}$ alkylthio, wherein the alkyl can be unsubstituted or substituted by $C_{1-8}$ alkyl, hydroxy (—OH), by $CH_{6-12}$ aryl or by —$NR_8R_9$ in which $R_8$ and $R_9$ are independently hydrogen, $C_{1-8}$ alkyl or $C_{6-12}$ aryl;
$R_2$ and $R_3$,
$R_4$ and $R_5$,
$R_3$ and $R_4$ (only for (II)) can form a saturated or insaturated homocyclic or heterocyclic five-membered or six-membered ring which may additionally contain oxygen or further nitrogen as a ring member.
$R_6$ and $R_7$ independently of one another, represent hydrogen, cyano (—CN), halogen, nitro ($NO_2$), hydroxy, linear or branched $C_{1-8}$ alkoxy (—OR) wherein the alkyl (R) can be unsubstituted or substituted by $C_{1-8}$ alkyl, hydroxy (—OH), by $CH_{6-12}$ aryl or by —$NR_8R_9$ in which $R_8$ and $R_9$ are independently hydrogen, $C_{1-8}$ alkyl or $C_{6-12}$ aryl;
  linear or branched $C_{1-8}$ alkyl, wherein the alkyl can be unsubstituted or substituted by $C_{1-8}$ alkyl, hydroxy (—OH), by $CH_{6-12}$ aryl or by —$NR_8R_9$ in which $R_8$ and $R_9$ are independently hydrogen, $C_{1-8}$ alkyl or $C_{6-12}$ aryl;
  $CX_3$ where X can be chlorine, fluorine, bromine;
  linear or branched $C_{1-8}$ alkylthio, wherein the alkyl can be unsubstituted or substituted by $C_{1-8}$ alkyl, hydroxy (—OH), by $C_{6-12}$ aryl or by —$NR_8R_9$ in which $R_8$ and $R_9$ are independently hydrogen, $C_{1-8}$ alkyl or $C_{6-12}$ aryl;
  $C_6$-$C_{12}$ aryl, which is unsubstituted or substituted by $C_{1-8}$ alkyl, hydroxy (—OH), nitro ($NO_2$), cyano (—CN), halogen, by $CH_{6-12}$ aryl, by —$NR_8R_9$ in which $R_8$ and $R_9$ are independently hydrogen, $C_{1-8}$ alkyl or $C_{6-12}$ aryl or by $C_1$-$C_8$ alkoxy (—OR); or
$R_6$ and $R_7$ can form a homocyclic six-membered ring to give a compound of formula (I) or (II) which is represented by formula (III) or (IV)

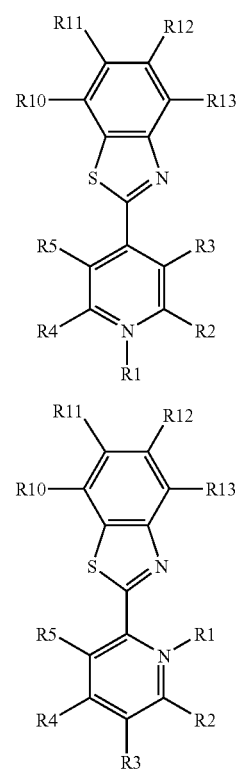

in which $R_{10}$-$R_{13}$ independently of one another represent hydrogen, cyano (—CN), halogen, nitro ($NO_2$), hydroxy, $C_{1-8}$ alkoxy (—OR) wherein the alkyl (R) can be unsubstituted or substituted by $C_{1-8}$ alkyl, hydroxy (—OH), by $C_{6-12}$ aryl or by —$NR_8R_9$ in which $R_8$ and $R_9$ are independently hydrogen, $C_{1-8}$ alkyl or $C_{6-12}$ aryl;
  $C_{1-8}$ alkyl, wherein the alkyl can be unsubstituted or substituted by $C_{1-8}$ alkyl, hydroxy (—OH), by $CH_{6-12}$ aryl or by —$NR_8R_9$ in which $R_8$ and $R_9$ are independently hydrogen, $C_{1-8}$ alkyl or $C_{6-12}$ aryl;
  $CX_3$ where X can be chlorine, fluorine, bromine;
  $C_{1-8}$ alkylthio, wherein the alkyl can be unsubstituted or substituted by $C_{1-8}$ alkyl, hydroxy (—OH), by $C_{6-12}$ aryl or by —$NR_8R_9$ in which $R_8$ and $R_9$ are independently hydrogen, $C_{1-8}$ alkyl or $C_{6-12}$ aryl;
An- represents an anion counter-part selected from inorganic anions such as iodine, fluorine, bromine, chlorine, perchlorate, hexafluoroantimonate, hexafluorophosphate, tetrafluoroborate, tetraphenylborate or organic anions such as dicyanoamide (N($CN)_2$) or trifluoromethanesulfonimide (N($SO_2CF_3)_2$); or
An⁻ can also be an anionic azo metal complex based on cobalt metal.

In a preferred aspect, the present invention is directed to an optical layer comprising at least one dye compound of formulae (I) or (II) wherein
$R_1$ represents a represents a linear or branched $C_{1-12}$ alkyl, $R_2$ to $R_5$ independently of one another, represent hydrogen, cyano (—CN), halogen, nitro ($NO_2$), hydroxy, $C_{1-8}$ alkoxy (—OR) wherein the alkyl (R) can be unsubstituted or substituted by $C_{1-8}$ alkyl, hydroxy (—OH), by $C_{6-12}$ aryl or by —$NR_8R_9$ in which $R_8$ and $R_9$ are independently hydrogen, $C_{1-8}$ alkyl or $C_{6-12}$ aryl;

$C_{1-8}$ alkyl, wherein the alkyl can be unsubstituted or substituted by $C_{1-8}$ alkyl, hydroxy (—OH), by $CH_{6-12}$ aryl or by —$NR_8R_9$ in which $R_8$ and $R_9$ are independently hydrogen, $C_{1-8}$ alkyl or $C_{6-12}$ aryl;

$CX_3$ where X can be chlorine, fluorine, bromine;

$C_{1-8}$ alkylthio, wherein the alkyl can be unsubstituted or substituted by $C_{1-8}$ alkyl, hydroxy (—OH), by $C_{6-12}$ aryl or by —$NR_8R_9$ in which $R_8$ and $R_9$ are independently hydrogen, $C_{1-8}$ alkyl or $C_{6-12}$ aryl;

$R_2$ and $R_3$, $R_4$ and $R_5$, can form a saturated or insaturated homocyclic or heterocyclic five-membered or six-membered ring which may additionally contain oxygen or further nitrogen as a ring member.

$R_6$ and $R_7$ independently of one another, represent hydrogen, cyano (—CN), halogen, nitro ($NO_2$), hydroxy, linear or branched $C_{1-8}$ alkoxy (—OR) wherein the alkyl (R) can be unsubstituted or substituted by $C_{1-8}$ alkyl, hydroxy (—OH), by $C_{6-12}$ aryl or by —$NR_8R_9$ in which $R_8$ and $R_9$ are independently hydrogen, $C_{1-8}$ alkyl or $C_{6-12}$ aryl;

linear or branched $C_{1-8}$ alkyl, wherein the alkyl can be unsubstituted or substituted by $C_{1-8}$ alkyl, hydroxy (—OH), by $C_{6-12}$ aryl or by —$NR_8R_9$ in which $R_8$ and $R_9$ are independently hydrogen, $C_{1-8}$ alkyl or $C_{6-12}$ aryl;

$CX_3$ where X can be chlorine, fluorine, bromine;

$C_6$-$C_{12}$ aryl, which is unsubstituted or substituted by $C_{1-8}$ alkyl, hydroxy (—OH), nitro ($NO_2$), cyano (—CN), halogen, by $C_{6-12}$ aryl, by —$NR_8R_9$ in which $R_8$ and $R_9$ are independently hydrogen, $C_{1-8}$ alkyl or $C_{6-12}$ aryl or by $C_1$-$C_8$ alkoxy (—OR); or $R_6$ and $R_7$ can form a homocyclic six-membered ring to give a compound of formula (I) or (II) which is represented by formula (III) or (IV) as above, in which $R_{10}$-$R_{13}$ independently of one another represent hydrogen, cyano (—CN), halogen, nitro ($NO_2$), hydroxy, $C_{1-8}$ alkoxy (—OR) wherein the alkyl (R) can be unsubstituted or substituted by $C_{1-8}$ alkyl, hydroxy (—OH), by $C_{6-12}$ aryl or by —$NR_8R_9$ in which $R_8$ and $R_9$ are independently hydrogen, $C_{1-8}$ alkyl or $C_{6-12}$ aryl;

$C_{1-8}$ alkyl, wherein the alkyl can be unsubstituted or substituted by $C_{1-8}$ alkyl, hydroxy (—OH), by $CH_{6-12}$ aryl or by —$NR_8R_9$ in which $R_8$ and $R_9$ are independently hydrogen, $C_{1-8}$ alkyl or $C_{6-12}$ aryl;

$CX_3$ where X can be chlorine, fluorine, bromine;

An- represents an anion counter-part selected from inorganic anions such as iodine, fluorine, bromine, chlorine, perchlorate, hexafluoroantimonate, hexafluorophosphate, tetrafluoroborate, tetraphenylborate or organic anions such as dicyanoamide (N(CN)$_2$) or trifluoromethanesulfonimide (N(SO$_2$CF$_3$)$_2$); or An⁻ can also be an anionic azo metal complex based on cobalt metal.

In a more preferred aspect, the present invention is directed to an optical layer comprising at least one dye compound of formulae (I) or (II), wherein $R_1$ represents a represents a linear or branched $C_{1-6}$ alkyl, $R_2$ to $R_5$ represent hydrogen, $R_6$ represents hydrogen, cyano (—CN), halogen, nitro ($NO_2$), hydroxy, linear or branched $C_{1-8}$ alkoxy (—OR) wherein the alkyl (R) can be unsubstituted or substituted by $C_{1-8}$ alkyl, hydroxy (—OH), by $CH_{6-12}$ aryl or by —$NR_8R_9$ in which $R_8$ and $R_9$ are independently hydrogen, $C_{1-8}$ alkyl or $C_{6-12}$ aryl;

linear or branched $C_{1-8}$ alkyl, wherein the alkyl can be unsubstituted or substituted by $C_{1-8}$ alkyl, hydroxy (—OH), by $CH_{6-12}$ aryl or by —$NR_8R_9$ in which $R_8$ and $R_9$ are independently hydrogen, $C_{1-8}$ alkyl or $C_{6-12}$ aryl;

$CX_3$ where X can be chlorine, fluorine, bromine;

$C_6$-$C_{12}$ aryl, which is unsubstituted or substituted by $C_{1-8}$ alkyl, hydroxy (—OH), nitro ($NO_2$), cyano (—CN), halogen, by $CH_{6-12}$ aryl, by —$NR_8R_9$ in which $R_8$ and $R_9$ are independently hydrogen, $C_{1-8}$ alkyl or $C_{6-12}$ aryl or by $C_1$-$C_8$ alkoxy (—OR)

$R_7$ represents hydrogen or $R_6$ and $R_7$ can form a homocyclic six-membered ring to give a compound of formula (I) or (II) which is represented by formula (III) or (IV) as above, in which $R_{10}$-$R_{13}$ independently of one another represent hydrogen, cyano (—CN), halogen, $C_{1-8}$ alkyl, wherein the alkyl can be unsubstituted or substituted by $C_{1-8}$ alkyl, hydroxy (—OH), by $C_{6-12}$ aryl or by —$NR_8R_9$ in which $R_8$ and $R_9$ are independently hydrogen, $C_{1-8}$ alkyl or $C_{6-12}$ aryl;

An- represents an anion counter-part selected from inorganic anions such as iodine, fluorine, bromine, chlorine, perchlorate, hexafluoroantimonate, hexafluorophosphate, tetrafluoroborate; or An⁻ can also be an anionic azo metal complex based on cobalt metal.

In a most preferred embodiment, the present invention is directed to an optical layer comprising a dye compound of formula (I), wherein $R_1$ represents a linear or branched $C_{1-6}$ alkyl, $R_2$ to $R_5$ represent hydrogen, $R_6$ represents hydrogen, methyl, ethyl, phenyl, 4-methoxyphenyl, tert butyl, trifluoromethyl, $R_7$ represents hydrogen, or $R_6$ and $R_7$ can form a homocyclic six-membered ring to give a compound of formula (I) which is represented by formula (III) as above, in which $R_{10}$, $R_{12}$ and $R_{13}$ represent hydrogen and $R_{11}$ represents methyl or chlorine, An- represents an anion counter-part selected from inorganic anions such as iodine, chlorine, perchlorate, hexafluoroantimonate, hexafluorophosphate, tetrafluoroborate, or an anionic azo cobalt complex of the following formula

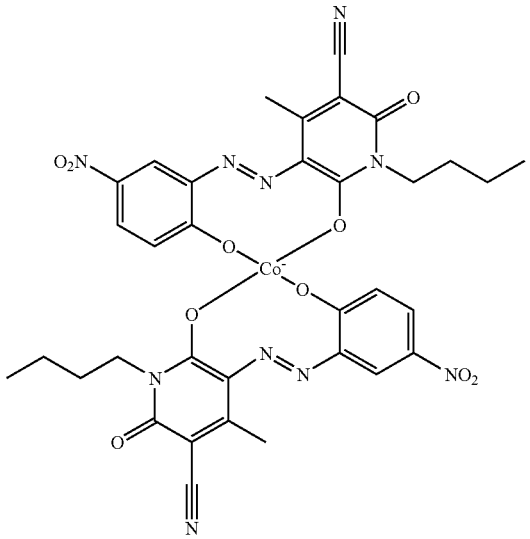

An optical layer according to the invention may also comprise a mixture of two or more, preferably of two dye compounds of formula (I) or (II) as defined above.

The thiazolyl-pyridinium based dye compounds of formula (I) or (II) provide for particularity preferable properties when used in optical layers for optical data recording media according to the invention.

In a further aspect the invention relates to new thiazolyl-pyridinium based dye compounds of formula (V) or (VI)

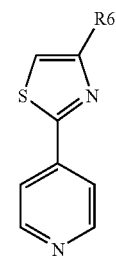

(V)

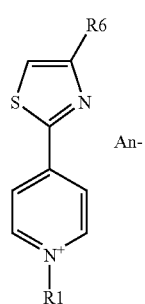

(VI)

wherein

R$^1$ is selected from methyl, ethyl, n- or i-propyl;
R$_6$ is selected from tert.butyl, methoxy or CF$_3$;
An- is defined as above;

as well as to the compounds of formula (VII) or (VIII)

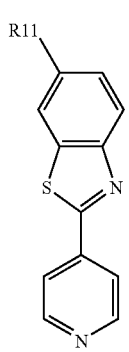

(VII)

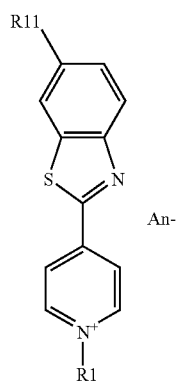

(VIII)

wherein

R$_1$ is selected from methyl, ethyl, n- or i-propyl;
R$_{11}$ is selected from hydrogen, cyano (—CN), C$_{1-8}$alkyl (preferably methyl), halogen (preferably Cl);
An- is defined as above.

Further, the invention relates to a method for producing optical layers comprising the following steps (a) providing a substrate,
(b) dissolving a dye compound or a mixture of dye compounds of formula (I) or (II) in an organic solvent to form a solution,
(c) coating the solution (b) on the substrate (a);
(d) evaporating the solvent to form a dye layer.

Preferred substrates are polycarbonate (PC) or polymethylmethacrylate (PMMA).

Organic solvents are selected from C$_{1-8}$ alcohol, halogen substituted C$_{1-8}$ alcohols, C$_{1-8}$ ketone, C$_{1-8}$ ether, halogen substituted C$_{1-4}$ alkane, or amides.

Preferred C$_{1-8}$ alcohols or halogen substituted C$_{1-8}$ alcohols are for example methanol, ethanol, isopropanol, diacetone alcohol (DAA), 2,2,3,3-tetrafluoropropanol, trichloroethanol, 2-chloroethanol, octafluoropentanol or hexafluorobutanol.

Preferred C$_{1-8}$ ketones are for example acetone, methylisobutylketone, methylethylketone, or 3-hydroxy-3-methyl-2-butanone.

Preferred halogen substituted C$_{1-4}$ alkanes are for example chloroform, dichloromethane or 1-chlorobutane.

Preferred amides are for example dimethylformamide or dimethylacetamide.

The optical layer (dye layer) obtained preferably has a thickness from 70 to 250 nm.

In a preferred aspect, the present invention provides for an optical layer suitable for high-density recording material, e.g. of the WORM disc format, in a laser wavelength range of from 350-450 nm, preferably around 405 nm.

The dye compounds of formula (I) or (II) possess the required optical characteristics (such as high absortivity, high recording sensitivity as example), an excellent solubility in organic solvents, an excellent light stability and a decomposition temperature of 250-300° C.

Preparation of Thiazolyl-Pyridinium Based Type Dyes According to the Invention

The thiazolyl-pyridinium based dye compounds of formula (I) and (II) are obtained by reacting a pyridine-4-thioamide (A) or a pyridine-2-thioamide (B), respectively, with a alpha-haloketone (F) in a polar solvent in a ratio of 1:1 to get (G) or (H) respectively, followed by reacting the substituted pyridine moiety with an alkylating agent in a polar solvent. Anion exchange is performed on compound (I) or (II) in an inert solvent under reflux condition with the corresponding counter-ion suitable for the exchange.

The preparation of benzothiazolylpyridinium based dye compounds may also be carried out by reacting pyridine-4-carbaldehyde (C) or pyridine-2-carbaldehyde (D), respectively with an o-hydroxyaniline zinc salt of formula (E) in a polar solvent in a ratio of 1:1 to get (K) or (L) respectively, followed by reacting the substituted pyridine moiety with an alkylating agent in a polar solvent.

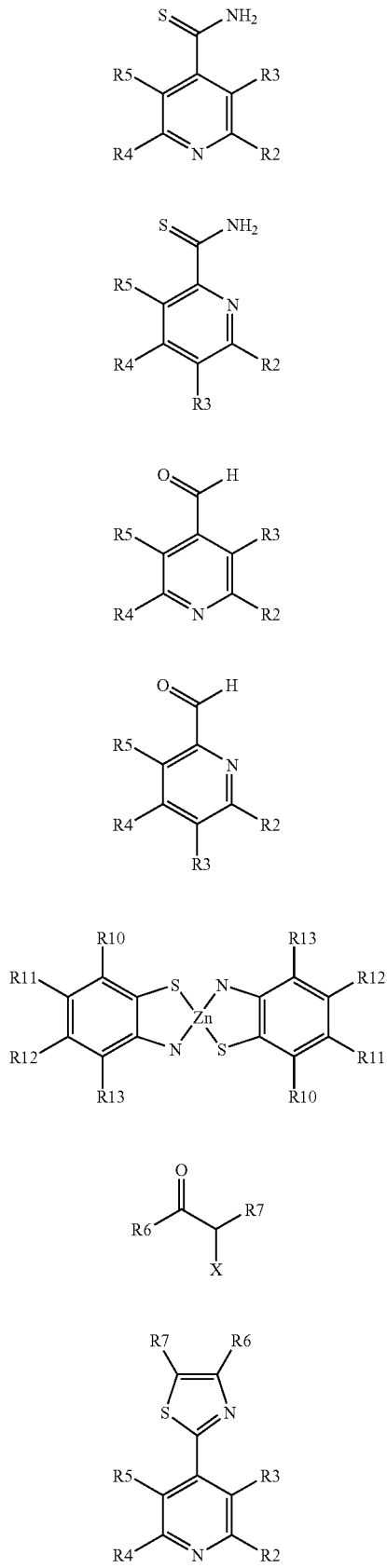

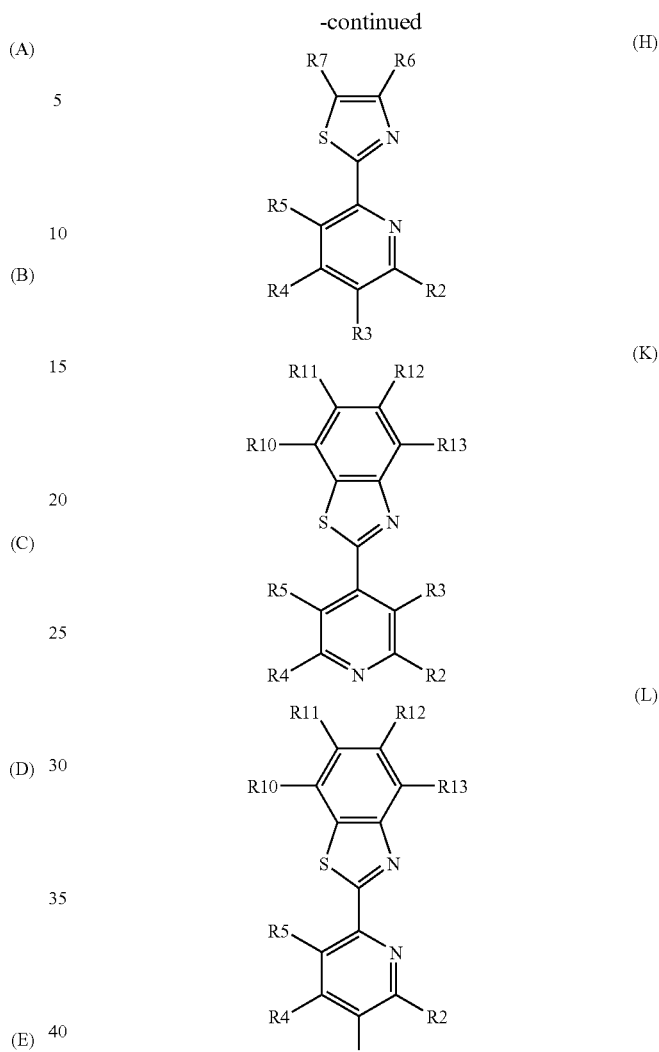

wherein $R_2$ to $R_{13}$ and An- are defined as above. X represents halogen.

The process for the preparation of dyes of formula (I) and (II) can be described by the following steps:

(a) a reaction between (A) or (B) or (C) or (D) and (E) or (F) to form the thiazolylpyridine (G) or (H) or (K) or (L).

(b) an alkylation reaction of the thiazolylpyridine (G) or (H) or (K) or (L) using a slight excess of alkylating agent leading to the dye (I) or (II) respectively (c) An anion exchange on compound (I) or (II) using an inert solvent and a suitable counter-ion.

The preferred solvent of the condensation step (step (a)) of (A) or (B) or (C) or (D) and (E) or (F) is selected from the group consisting of ketones (acetone, methylethylketone), alcohols (methanol, ethanol, 1-propanol, 2-propanol) or halogenated solvents (dichloromethane, trichloromethane).

The preferred solvent for the step (b) is selected from the group consisting of ketones (acetone, methylethylketone), halogenated solvents (dichloromethane, dichloroethane), dimethylformamide (DMF), N-methylpyrolidone (NMP).

The most preferred solvents for step (c) are methylethylketone, dichloromethane, acetonitrile or 2-propanole.

Preparation of an Optical Layer

An optical layer according to the invention comprises a dye of formula (I) or (II) or a mixture of dyes of formula (I) or (II).

A method for producing an optical layer according to the invention comprises the following steps (a) Providing a substrate,
(b) Dissolving a dye compound or a mixture of dye compounds of formula (I) or (II) in an organic solvent to form a solution,
(c) Coating the solution (b) on the substrate (a);
(d) Evaporating the solvent to form a dye layer.

Preparing of the High Density Optical Recording Medium

A method for producing an optical recording medium comprising an optical layer according to the invention comprises the following additional steps (e) sputtering a metal layer onto the dye layer
(f) applying a second polymer based layer to complete the disk.

A high-density data storage medium according to the invention therefore preferably is a recordable optical disc comprising: a first substrate, which is a transparent substrate with grooves, a recording layer (optical layer), which is formed on the first substrate surface using the dye of formula (I) or (II), a reflective layer formed on the recording layer, a second substrate, which is a transparent substrate with grooves connected to the reflective layer with an attachment layer.

The dyes of formula (I) or (II) in the form of a solid film have a high refractive index at the longer wavelength flank of the absorption band, which preferably achieves a peak value of from 2.0 to 3.0 in the range of from 350 to 500 nm. The dyes of formula (I) or (II) allow providing a medium having high reflectivity as well as high sensitivity and good playback characteristics in the desired spectral range.

(a) Substrate

The substrate, which functions as support for the layers applied thereto, is advantageously semi-transparent (T>10%) or preferably transparent (T>90%). The support can have a thickness of from 0.01 to 10 mm, preferably from 0.1 to 5 mm.

Suitable substrates are, for example, glass, minerals, ceramics and thermosetting or thermoplastic plastics. Preferred supports are glass and homo- or co-polymeric plastics. Suitable plastics are, for example, thermoplastic polycarbonates, polyamides, polyesters, polyacrylates and polymethacrylates, polyurethanes, polyolefins, polyvinyl chloride, polyvinylidene fluoride, polyimides, thermosetting polyesters and epoxy resins.

The most preferred substrates are polycarbonate (PC) or polymethylmethacrylate (PMMA).

The substrate can be in pure form or may also comprise customary additives, for example UV absorbers or dyes, as proposed e.g. in JP 04/167239 as light-stabilizers for the recording layer. In the latter case it may be advantageous for the dye added to the support substrate to have an absorption maximum hypso-chromically shifted relative to the dye of the recording layer by at least 10 nm, preferably by at least 20 nm.

The substrate is advantageously transparent over at least a portion of the range from 350 to 500 nm, so that it is permeable to at least 90% of the incident light of the writing or readout wavelength.

(b) Organic Solvents

Organic solvents are selected from $C_{1-8}$ alcohol, halogen substituted $C_{1-8}$ alcohols, $C_{1-8}$ ketone, $C_{1-8}$ ether, halogen substituted $C_{1-4}$ alkane, or amides.

Preferred $C_{1-8}$ alcohols or halogen substituted $C_{1-8}$ alcohols are for example methanol, ethanol, isopropanol, diacetone alcohol (DAA), 2,2,3,3-tetrafluoropropanol, trichloroethanol, 2-chloroethanol, octafluoropentanol or hexafluorobutanol.

Preferred $C_{1-8}$ ketones are for example acetone, methylisobutylketone, methylethylketone, or 3-hydroxy-3-methyl-2-butanone.

Preferred halogen substituted $C_{1-4}$ alkanes are for example chloroform, dichloromethane or 1-chlorobutane.

Preferred amides are for example dimethylformamide or dimethylacetamide.

(c) Recording Layer

The recording layer (optical layer) is preferably arranged between the transparent substrate and the reflecting layer. The thickness of the recording layer is from 10 to 1000 nm, preferably from 30 to 300 nm, especially about 80 nm, for example from 60 to 120 nm.

The use of dyes of formula (I) or (II) results in advantageously homogeneous, amorphous and low-scattering recording layers having a high refractive index. The absorption edge is surprisingly steep even in the solid phase. Further advantages are high light stability in daylight and under laser radiation of low power density with, at the same time, high sensitivity under laser radiation of high power density, uniform script width, high contrast, and also good thermal stability and storage stability.

The recording layer, instead of comprising a single compound of formula (I) or (II), may also comprise a mixture of such compounds according to the invention. By the use of mixtures, for example mixtures of isomers or homologues as well as mixtures of different structures, the solubility can often be increased and/or the amorphous content improved.

For a further increase in stability it is also possible, if desired, to add known stabilizers in customary amounts, for example a nickel dithiolate as light stabilizer, as described in JP 04/025493.

The recording layer comprises a compound of formula (I) or (II) or a mixture of such compounds preferably in an amount sufficient to have a substantial influence on the refractive index, for example at least 30% by weight, more preferably at least 60% by weight, most preferably at least 80% by weight.

Further customary components are, for example other chromophores (for example those disclosed in WO-01/75873, or others having an absorption maximum at from 300 to 1000 nm), stabilizers, $^1O_2$-, triplet- or luminescence quenchers, melting-point reducers, decomposition accelerators or any other additives that have already been described in optical recording media. Preferably, stabilizers or fluorescence-quenchers are added if desired.

When the recording layer comprises further chromophores, they may in principle be any dye that can be decomposed or modified by the laser radiation during the recording, or they may be inert towards the laser radiation. When the further chromophores are decomposed or modified by the laser radiation, this can take place directly by absorption of the laser radiation or can be induced indirectly by the decomposition of the compounds of formula (I) or (II) according to the invention, for example thermally.

Naturally, further chromophores or colored stabilizers may influence the optical properties of the recording layer. It is therefore preferable to use further chromophores or coloured stabilizers, the optical properties of which conform as far as possible to those of the compounds formula (I) or (II) or are as different as possible, or the amount of further chromophores is kept small.

When further chromophores having optical properties that conform as far as possible to those of compounds formula (I) or (II) are used, preferably this should be the case in the range of the longest-wavelength absorption flank. Preferably the wavelengths of the inversion points of the further chromophores and of the compounds of formula (I) and (II) are a maximum of 20 nm, especially a maximum of 10 nm, apart. In that case the further chromophores and the compounds of formula (I) or (II) should exhibit similar behavior in respect of the laser radiation, so that it is possible to use as further chromophores known recording agents the action of which is synergistically enhanced by the compounds of formula (I) or (II).

When further chromophores or colored stabilizers having optical properties that are as different as possible from those of compounds of formula (I) or (II) are used, they advantageously have an absorption maximum that is hypso-chromically or batho-chromically shifted relative to the dye of formula (I) or (II). In that case the absorption maxima are preferably at least 50 nm, especially at least 100 nm, apart.

Examples thereof are UV absorbers that are hypso-chromic to the dye of formula (I) or (II) or colored stabilizers that are bathochromic to the dye of formula (I) or (II) and have absorption maxima lying, for example, in the NIR or IR range.

Other dyes can also be added for the purpose of color-coded identification, color-masking ("diamond dyes") or enhancing the aesthetic appearance of the recording layer. In all those cases, the further chromophores or colored stabilizers should preferably exhibit behavior towards light and laser radiation that is as inert as possible.

When another dye is added in order to modify the optical properties of the compounds of formula (I) or (II), the amount thereof is dependent upon the optical properties to be achieved. The person skilled in the art will find little difficulty in varying the ratio of additional dye to compound of formula (I) or (II) until he obtains his desired result.

When chromophores or colored stabilizers are used for other purposes, the amount thereof should preferably be small so that their contribution to the total absorption of the recording layer in the range of from 350 to 500 nm is a maximum of 20%, preferably a maximum of 10%. In such a case, the amount of additional dye or stabilizer is advantageously a maximum of 50% by weight, preferably a maximum of 10% by weight, based on the recording layer.

Further chromophores that can be used in the recording layer in addition to the compounds of formula (I) or (II) are described in the following patents

| Applicant | Patent Application No. |
|---|---|
| Ricoh | JP2002283722, JP2003094824, JP200283732, JP2003063139 |
| Mitsubishi | JP2003019867, JP2001271001, JP2002036727, JP2001181524, JP2003170662, JP2003237233, JP2002002110, JP2003103935, JP2003127542 |
| Ciba | WO02/082438 |
| Sony | WO02/102598 |
| Kabushiki | EP1149873 |
| Bayer | WO02/084656, WO02080152 |
| Ciba | WO03/063151 |

| Applicant | Patent Application No. |
|---|---|
| FEW Chemicals | DE10109243 |
| Mitsui Chem | WO03035407, WO03039882, JP2003165273, JP2004082439, JP2003103932, JP2003074282, JP2003072238, JP2003211847, JP2002363437, WO03082593, JP2003286415, JP2003140300, JP2003266947, JP2002264520, JP2004090372, JP2004142131 |
| Sony Corp./Bayer AG | WO03030158 |
| Bayer AG | DE10245581, WO03079339 |
| Fuji Photo Film Co Ltd | JP2003075961, JP2003040851, EP1345217, JP2003211848 US2003180496, JP2003246141, JP2003211852, EP1193699, JP2004131396, JP2004050612 |
| Nippon Kayaku KK | JP2003170663 |
| Asashi Denka | JP2001047740, JP2004034645 |
| Taiyo Yuden | JP2003191641 |
| Nippon Kayaku KK | JP2003246142 |
| Canon | U.S. Pat. No. 4,804,613 |
| Matsushita | JP2003266938 |
| Shanghai Precision Opt. Instr. Inst. | CN1438221 |

Most preferably, however, no additional chromophore is added, unless it is a colored stabilizer.

Stabilizers, $^1O_2$-, triplet- or luminescence-quenchers are, for example, metal complexes of N- or S-containing enolates, phenolates, bisphenolates, thiolates or bisthiolates or of azo, azomethine or formazan dyes, such as bis(4-dimethylaminodithiobenzil)nickel [CAS N° 38465-55.3]. Hindered phenols and derivatives thereof such as o-hydroxyphenyl-triazoles or -triazines or other UV absorbers, such as hindered amines (TEMPO or HALS, as well as nitroxides or NOR-HALS), and also as cations diimmonium, Paraquat or Orthoquat salts, such as ®Kayasorb IRG 022, ®Kayasorb IRG 040, optionally also as radical ions, such as N,N,N',N'-tetrakis(4-dibutylaminophenyl)-p-phenylene amine-ammonium hexafluorophosphate, hexafluoroantimonate or perchlorate. The latter are available from Organica (Wolfen/DE); ®Kayasorb brands are available from Nippon Kayaku Co. Ltd.

The person skilled in the art will know from other optical information media, or will easily identify, which additives in which concentration are best suited to which purpose. Suitable concentrations of additives are, for example, from 0.001 to 1000% by weight, preferably from 1 to 50 (% by weight, based on the recording medium of formula (II)).

(e) Reflecting Layer

Reflecting materials suitable for the reflective layer include especially metals, which provide good reflection of the laser radiation used for recording and playback, for example the metals of Main Groups III, IV and V and of the Sub-groups of the Periodic Table of the Elements. Al, In, Sn, Pb, Sb, Bi, Cu, Ag, Au, Zn, Cd, Hg, Sc, Y, La, Ti, Zr, Hf, V, Nb, Ta, Cr, Mo, W, Fe, Co, Ni, Ru, Rh, Pd, Os, Ir, Pt, Ce, Pr, Nd, Pm, Sm, Eu, Gd, Th, Dy, Ho, Er, Tm, Yb and Lu and alloys thereof are especially suitable. Special preference is given to a reflective layer of aluminum, silver, copper, gold or an alloy thereof, on account of their high reflectivity and ease of production.

(f) Cover Layer/Protective Layer

Materials suitable for the cover layer/protective layer include plastics, which are applied in a thin layer to the support or the uppermost layer either directly or with the aid of adhesive layers. It is advantageous to select mechanically and thermally stable plastics having good surface properties, which may be modified further.

The plastics may be thermosetting plastics and thermoplastic plastics. Preference is given to radiation-cured (e.g. using UV radiation) protective layers, which are particularly simple and economical to produce. A wide variety of radiation-curable materials are known. Examples of radiation-curable monomers and oligomers are acrylates and methacrylates of diols, triols and tetrols, polyimides of aromatic tetracarboxylic acids and aromatic diamines having $C_1$-$C_4$ alkyl groups in at least two ortho-positions of the amino groups, and oligomers with dialkylmaleinimidyl groups, e.g. dimethyl maleinimidyl groups.

The recording media according to the invention may also have additional layers, for example interference layers. It is also possible to construct recording media having a plurality of (for example two) recording layers. The structure and the use of such materials are known to the person skilled in the art. Preferred, if present, are interference layers that are arranged between the recording layer and the reflecting layer and/or between the recording layer and the substrate and consist of a dielectric material, for example as described in EP 0353393 of $TiO_2$, $Si_3N_4$, ZnS or silicone resins.

The recording media according to the invention can be produced by processes known in the art.

Coating Methods

Suitable coating methods are, for example, immersion, pouring, brush-coating, blade-application and spin-coating, as well as vapor-deposition methods carried out under a high vacuum. When pouring methods are used, solutions in organic solvents are generally used. When solvents are employed, care should be taken that the supports used are insensitive to those solvents. Suitable coating methods and solvents are described, for example, in EP-A-401 791.

The recording layer is preferably applied by spin-coating with a dye solution, solvents that have proved satisfactory are preferably alcohols, e.g. 2-methoxyethanol, n-propanol, iso-propanol, isobutanol, n-butanol, amyl alcohol or 3-methyl-1-butanol or preferably fluorinated alcohols, e.g. 2,2,2-trifluoroethanol or 2,2,3,3-tetrafluoro-1-propanol, octafluoropentanol and mixtures thereof. It will be understood that other solvents or solvent mixtures can also be used, for example those solvent mixtures described in EP-A-511 598 and EP-A-833 316. Ethers (dibutyl ether), ketones (2,6-dimethyl-4-heptanone, 5-methyl-2-hexanone) or saturated or unsaturated hydrocarbons (toluene, xylene) can also be used, for example in the form of mixtures (e.g. dibutyl ether/2,6-dimethyl-4-heptanone) or mixed components.

The person skilled in the art of spin-coating will in general routinely try out all the solvents with which is he is familiar, as well as binary and ternary mixtures thereof, in order to discover the solvents or solvent mixtures which result in a high-quality and, at the same time, cost-effective recording layer containing the solid components of his choice. Known methods of process engineering can also be employed in such optimization procedures, so that the number of experiments to be carried out can be kept to a minimum.

The invention therefore relates also to a method of producing an optical recording medium, wherein a solution of a compound of formula (I) or (II) in an organic solvent is applied to a substrate having pits. The application is preferably carried out by spin-coating.

The application of the metallic reflective layer is preferably effected by sputtering, vapor-deposition in vacuum or by chemical vapor deposition (CVD). The sputtering technique is especially preferred for the application of the metallic reflective layer on account of the high degree of adhesion to the support. Such techniques are known and are described in specialist literature (e.g. J. L. Vossen and W. Kern, "Thin Film Processes", Academic Press, 1978).

Readout Methods

The structure of the recording medium according to the invention is governed primarily by the readout method; known function principles include the measurement of the change in the transmission or, preferably, in the reflection, but it is also known to measure, for example, the fluorescence instead of the transmission or reflection.

When the recording material is structured for a change in reflection, the following structures, can be used: transparent support/recording layer (optionally multilayered)/reflective layer and, if expedient, protective layer (not necessarily transparent); or support (not necessarily transparent)/reflective layer/recording layer and, if expedient, transparent protective layer. In the first case, the light is incident from the support side, whereas in the latter case the radiation is incident from the recording layer side or, where applicable, from the protective layer side. In both cases the light detector is located on the same side as the light source. The first-mentioned structure of the recording material to be used according to the invention is generally preferred.

When the recording material is structured for a change in light transmission, the following different structure comes into consideration: transparent support/recording layer (optionally multilayered) and, if expedient, transparent protective layer. The light for recording and for readout can be incident either from the support side or from the recording layer side or, where applicable, from the protective layer side, the light detector in this case always being located on the opposite side.

Suitable lasers are those having a wavelength of 350-500 nm, for example commercially available lasers having a wavelength of 405 to 414 nm, especially semi-conductor lasers. The recording is done, for example, point for point, by modulating the laser in accordance with the mark lengths and focusing its radiation onto the recording layer. It is known from the specialist literature that other methods are currently being developed which may also be suitable for use.

The process according to the invention allows the storage of information with great reliability and stability, distinguished by very good mechanical and thermal stability and by high light stability and by sharp boundary zones of the pits. Special advantages include the high contrast, the low jitter and the surprisingly high signal/noise ratio, so that excellent readout is achieved.

The readout of information is carried out according to methods known in the art by registering the change in absorption or reflection using laser radiation, for example as described in "CD-Player and R-DAT Recorder" (Claus Biaesch-Wiepke, Vogel Buchverlag, Würzburg 1992).

The optical recording medium according to the invention is preferably a recordable optical disc of the WORM type. It may be used, for example, as a playable HD-DVD (high density digital versatile disc) or Blu-ray® disc, as storage medium for a computer or as an identification and security card or for the production of diffractive optical elements, for example holograms.

The invention accordingly relates also to a method for the optical recording, storage and playback of information, wherein a recording medium according to the invention is used. The recording and the playback advantageously take place in a wavelength range of from 350 to 500 nm.

It has been found, that the new dyes of formula (I) or (II) according to the invention enhance the photosensitivity and the stability to light and heat compared to dyes already known in the art. The new dyes of formula (I) or (II) according to the invention have a decomposition temperature of 250-350° C. Additionally, these compounds show an extremely good solubility in organic solvents, which is ideal for the spin-coating process to manufacture optical layers.

Thus, it is of great advantage to use these new compounds in the recording layer of high-density recordable optical discs.

EXAMPLES

All thiazolyl-pyridinium based dye compounds were prepared using standard procedures known in the art, in particular using reactions as described above.

In the following examples "part" is always part by weight unless indicated otherwise.

Example 1

13 parts of pyridine-4-thioamide are suspended in 195 parts of ethanol. 20 parts or 2-bromoacetophenone are added and the mixture is refluxed for 5 h. The crude product is filtered, treated with 79 parts of acetone, filtered at 40° C. and dried at 80° C. under vacuo. 100 parts of aqueous ammonia (13%) are added, the mixture stirred 30 min. at room temperature, the product filtered and washed with water. Afterwards, the product is recrystallized from 250 parts of aqueous methanol (70%). 15 parts of 4-[4-phenyl-thiazolyl-(2)]pyridine are obtained as beige crystals.

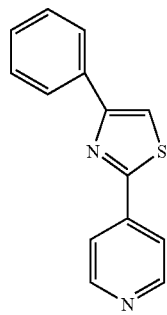

(1)

Example 2-4

The following compounds are synthesized according to the procedures described for example 1.

Example 2

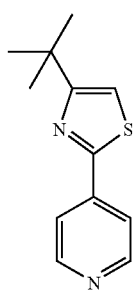

(2)

4-[4-tert-butyl-thiazolyl-(2)]-pyridine

Example 3

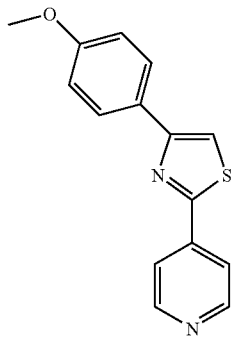

(3)

4-[(4-methoxyphenyl)thiazolyl-(2)]-pyridine

Example 4

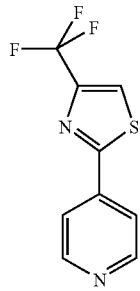

(4)

4-[4-trifluoromethylthiazolyl-(2)]-pyridine

Example 5

20 parts of 2-amino-5-methylthiophenol zinc salt are refluxed in 315 parts of acetic acid and treated with 12.5 parts pyridine-4-carbaldehyde. After 15 min. the mixture is cooled to room temperature, added to 600 parts of water and stirred for 1 h. The product is filtered and washed with water to yield 22 parts of 6-methyl-2-pyridin-4-yl-benzothiazole.

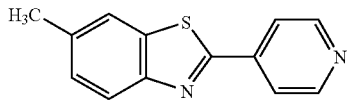

Example 6

6-chlor-2-pyridin-4-yl-benzothiazole is synthesized according to the procedure described for example 5.

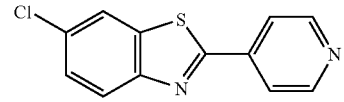

Example 7

20 parts of the compound obtained in example 1 and 15 parts of 2-iodopropane are refluxed in 158 parts of acetone for 2 h. At room temperature, 500 parts of ethyl acetate are added and the precipitate filtered to obtain 0.7 parts of 1-isopropyl-4-[4-phenyl-thiazolyl-(2)]-pyridiniumiodide.

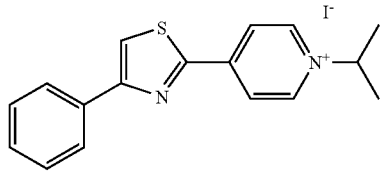

UV-Vis (MeOH) $\lambda_{max}$: 373 nm; $\in (\lambda_{max})$: 31 L·g$^{-1}$·cm$^{-1}$; solubility (in tetrafluoropropanol, 20° C.): >50 g/L; TGA (decomp.)=270° C.; MS (positive mode): 281 (M$^+$), (negative mode): 127 (I$^-$).

Example 8

85 parts of the compound obtained in example 2, 277 parts of iodomethane and 1200 parts of 2-butanone are stirred for 8h at 100° C. in a pressure vessel. The product is filtered, washed with ethyl acetate and dried to obtain 111 parts of 1-methyl-4-[4-tert-butyl-thiazolyl-(2)]-pyridiniumiodide.

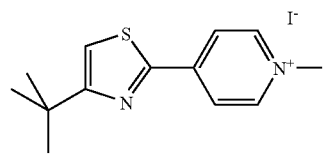

UV-Vis (MeOH) $\lambda_{max}$: 359 nm; $\in (\lambda_{max})$: 56 L·g$^{-1}$·cm$^{-1}$; solubility (in 2,2,3,3-tetrafluoropropanol, 20° C.): >50 µg/L; $^1$H-NMR (500 MHz, CDCl$_3$) δ=1.40 (9H), 4.71 (3H), 7.35 (1H), 8.46 (2H), 9.35 (2H).

Example 9-11

The following compounds are synthesized according to the procedures described for example 8.

Example 9

Starting with a compound of example 1 to yield 1-methyl-4-[4-phenyl-thiazolyl-(2)]-pyridinium iodide

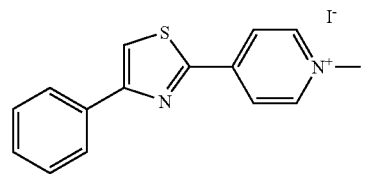

UV-Vis (MeOH) $\lambda_{max}$: 389 nm; $\in (\lambda_{max})$ 32 L·g$^{-1}$·cm$^{-1}$; solubility (in 2,2,3,3-tetrafluoropropanol, 20° C.): >30 g/L; TGA (decomp.)=260° C.; $^1$H-NMR (500 MHz, D$_6$-DMSO) δ=4.37 (3H), 7.46 (1H), 7.53 (2H), 8.12 (2H), 8.68 (3H), 9.07 (2H).

Example 10

Starting with a compound of example 3 to yield 4-[4-(4-methoxy-phenyl)-thiazol-2-yl]-1-methyl-pyridinium iodide

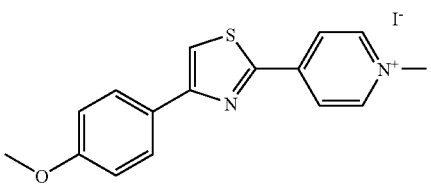

UV-Vis (MeOH) $\lambda_{max}$: 403 nm; $\in (\lambda_{max})$: 18.3 L·g$^{-1}$·cm$^{-1}$; solubility (in 2,2,3,3-tetrafluoropropanol, 20° C.): >50 g/L; TGA (decomp.)=250° C.; $^1$H-NMR (500 MHz, D$_6$-DMSO) δ=3.83 (3H), 4.37 (3H), 7.07 (2H), 8.05 (2H), 8.52 (1H), 8.66 (2H), 9.05 (2H)

Example 11

Starting with a compound of example 3 to yield 1-isopropyl-4-[4-(4-methoxy-phenyl)-thiazol-2-yl]-1-methyl-pyridinium iodide

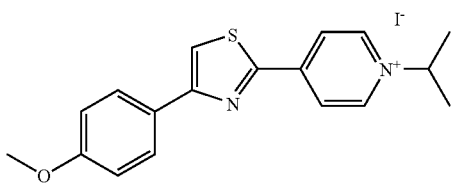

UV-Vis (MeOH) $\lambda_{max}$: 405 nm; $\in (\lambda_{max})$: 19.4 L·g$^{-1}$·cm$^{-1}$; solubility (in 2,2,3,3-tetrafluoropropanol, 20° C.): >50 g/L; TGA (decomp.)=240° C.; $^1$H-NMR (500 MHz, D$_6$-DMSO) δ=1.65 (6H), 3.83 (3H), 5.07 (1H), 7.08 (2H), 8.06 (2H), 8.53 (1H), 8.66 (2H), 9.25 (2H).

Example 12

10 parts of the compound obtained in example 6 and 7 parts of dimethylsulfate are stirred at 100° C. for 30 minutes. At room temperature, 100 parts of water and 12 parts of potassium iodide are added and the product filtered. The product is washed with water and dried to yield 11 parts of 1-methyl-4-(6-chlor-benzothiazol-2-yl)pyridinium iodide.

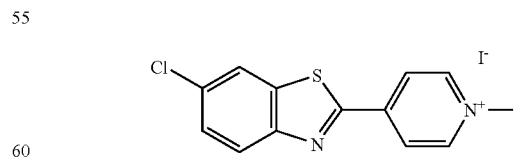

UV-Vis (MeOH) $\lambda_{max}$: 351 nm; $\in (\lambda_{max})$: 46 L·g$^{-1}$·cm$^{-1}$; solubility (in 2,2,3,3-tetrafluoropropanol, 20° C.): >50 g/L; TGA (decomp.)=244° C.; $^1$H-NMR (500 MHz, D$_6$-DMSO) δ=4.41 (3H), 7.74 (1H), 8.26 (1H), 8.55 (1H), 8.75 (2H), 9.13 (2H).

Example 13

2.5 parts of 1-methyl-4-[4-tert-butyl-thiazolyl-(2)]-pyridiniumiodide of example 8 and 6.3 parts of cobalt complex with triethylammonium as counter-ion are mixed into 50 parts of acetonitrile. The mixture is then stirred at reflux for 12 hours. The mixture is cooled to 25° C., filtered and washed with acetonitrile. The marroon presscake is dried and the final dye is obtained with 95% yield.

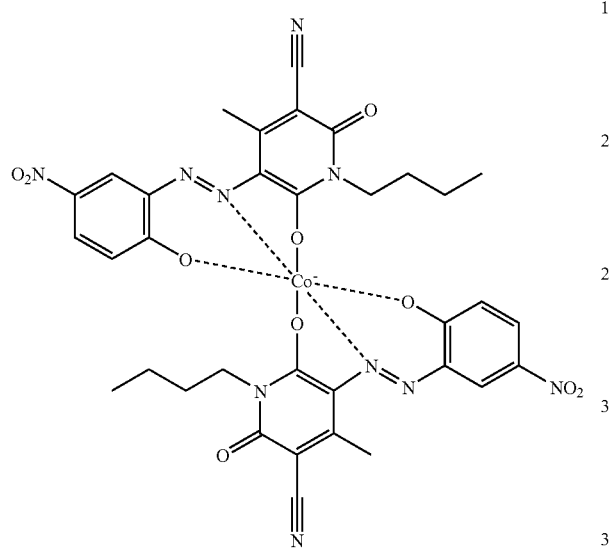

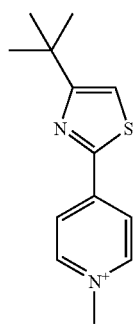

UV-Vis (CH2Cl2) $\lambda_{max}$: 512 nm; $\in$ ($\lambda_{max}$): 55.0 L·g$^{-1}$·cm$^{-1}$; Solubility (in Tetrafluoropropanol, 25° C.): 20 g/l; DSC (decomp.)=341° C.; Heat release (W/g)=15; On spin coated disc: $n_{(405nm)}$=1.61, $k_{(405nm)}$=0.26.

Example 14

2.0 parts 1-methyl-4-[4-phenyl-thiazolyl-(2)]-pyridinium iodide of example 9 and 7.2 parts of cobalt complex with triethylammonium as counter-ion are mixed into 50 parts of acetonitrile. The mixture is then stirred at reflux for 12 hours. The mixture is cooled to 25° C., filtered and washed with acetonitrile. The marroon presscake is dried and the final dye is obtained with 90% yield.

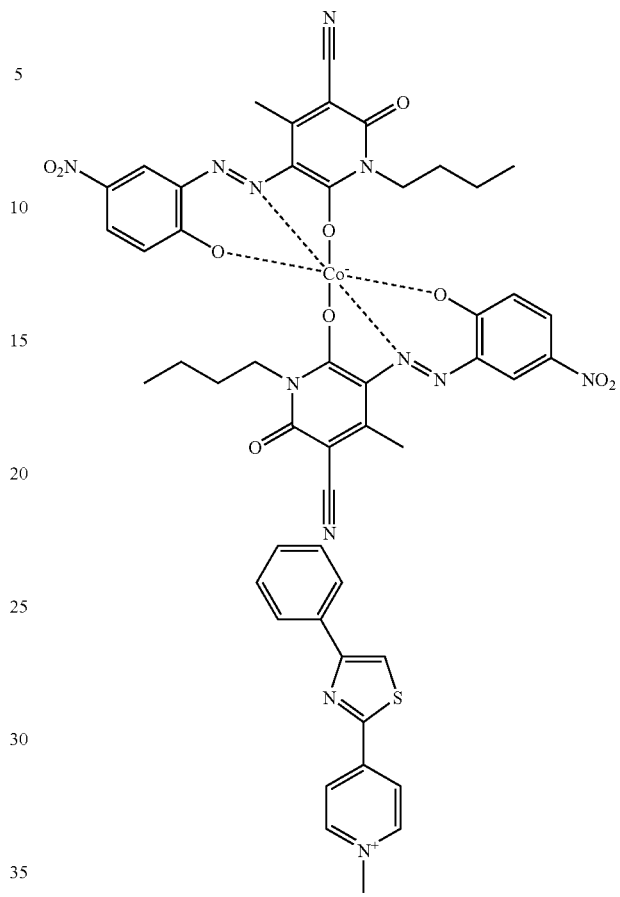

UV-Vis (CH2Cl2) $\lambda_{max}$: 479 nm; $\in$ ($\lambda_{max}$): 50 L·g$^{-1}$·cm$^{-1}$; Solubility (in Tetrafluoropropanol, 25° C.): 20 g/L; DSC (decomp.)=322° C.; Heat release (W/g)=6; On spin coated disc: $n_{(405nm)}$=1.58, $k_{(405nm)}$=0.34.

Application Example

The optical and thermal properties of the thiazolyl-pyridinium based dye compounds were studied. The dyes show high absorption at the desired wavelengths. In addition, the shape of the absorption spectra, that still remains critical to the disc reflectivity and formation of clean mark edges, are composed of one major band, comprised in a range of from 350 to 500 nm, preferably of from 350 to 400 nm.

More precisely, n values of the refractive index were evaluated between 1.0 and 2.7 (see examples 13, 14). Light stabilities were found comparable to commercial dyes which usually are stabilised with quenchers for the use in optical data recording.

Sharp threshold of thermal decomposition within the required temperature range characterizes the new thiazolylpyridinium based dyes which are assumed to be desirable for the application in optical layers for optical data recording.

As a conclusion, the thiazolyl-pyridinium based dye compounds are within the specifications which are primarily required by the industry for the use of dyes in optical data recording, in particular in the next-generation optical data recording media in the blue laser range.

The invention claimed is:
1. An optical layer comprising at least one dye compound of formula (I) or (II)

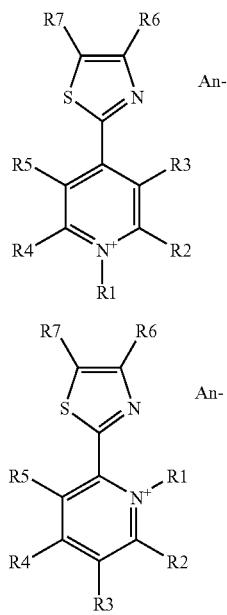

wherein
R1 is a linear or branched $C_{1-12}$ alkyl,
R2 to R5 independently of one another, are hydrogen, cyano (—CN), halogen, nitro (NO$_2$), hydroxy, $C_{1-8}$ alkoxy (—OR) wherein (R) is alkyl which is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl; $C_{1-8}$ alkyl, wherein the alkyl is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl;
CX3 where X is chlorine, fluorine or bromine;
$C_{1-8}$ alkylthio, wherein the alkyl is unsubstituted or substituted by $C_{1-8}$ alkyl, hydroxy (—OH), $C_{6-12}$ aryl or by —NR8R9, wherein R8 and R9 are independently hydrogen, $C_{1-8}$ alkyl or $C_{6-12}$ aryl; or wherein, for formula (I),
R2 and R3, or
R4 and R5,
form a saturated or unsaturated homocyclic or heterocyclic five-membered or six-membered ring optionally containing oxygen or an additional nitrogen as a ring member; or wherein, for formula (II)
R2 and R3,
R4 and R5, or
R3 and R4 form a saturated or unsaturated homocyclic or heterocyclic five-membered or six-membered ring optionally containing oxygen or an additional nitrogen as a ring member;
R6 and R7 independently of one another, are hydrogen, cyano (—CN), halogen, nitro (NO$_2$), hydroxy, linear or branched $C_{1-8}$ alkoxy (—OR) wherein (R) is alkyl which is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl; linear or branched $C_{1-8}$ alkyl, wherein the alkyl is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl;

CX$_3$ where X is chlorine, fluorine or bromine;
linear or branched $C_{1-8}$ alkylthio, wherein the alkyl is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl;
$C_6$-$C_{12}$ aryl, unsubstituted or substituted by $C_{1-8}$ alkyl, hydroxy (—OH), nitro (NO$_2$), cyano (—CN), halogen, $C_{6-12}$ aryl, —NR8R9, wherein R8 and R9 are independently hydrogen, $C_{1-8}$ alkyl or $C_{6-12}$ aryl or $C_1$-$C_8$ alkoxy (—OR); or
R6 and R7 form a homocyclic six-membered ring to give a compound of formula (I) or (II) represented by formula (III) or (IV)

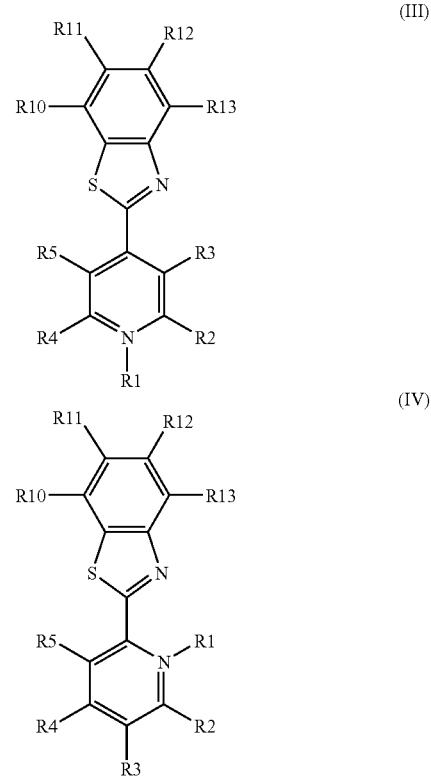

wherein R10-R13 independently of one another represent hydrogen, cyano (—CN), halogen, nitro (NO$_2$), hydroxy, $C_{1-8}$ alkoxy (—OR) wherein the alkyl (R) is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl; $C_{1-8}$ alkyl, wherein the alkyl is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl;
CX3 where X is chlorine, fluorine or bromine;
$C_{1-8}$ alkylthio, wherein the alkyl is unsubstituted or substituted by $C_{1-8}$ alkyl, hydroxy (—OH), $C_6$-$C_{12}$ aryl or —NR8R9, wherein R8 and R9 are independently hydrogen, $C_{1-8}$ alkyl or $C_{6-12}$ aryl;
An- is an anionic azo metal complex of the following formula

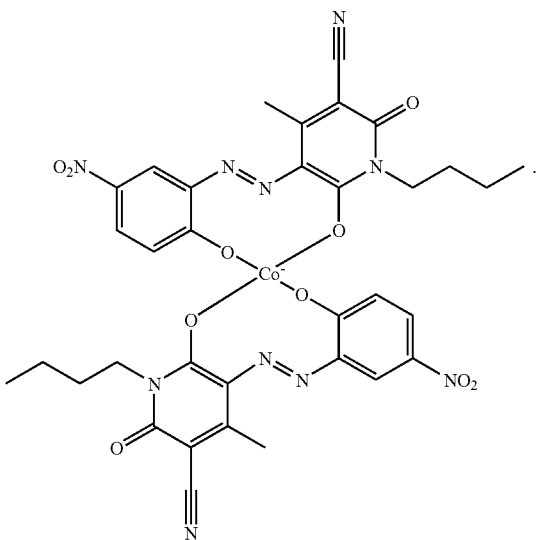

2. An optical layer according to claim 1, wherein
R1 is a linear or branched $C_{1-12}$ alkyl, R2 to R5 independently of one another, are hydrogen, cyano (—CN), halogen, nitro ($NO_2$), hydroxy, $C_{1-8}$ alkoxy (—OR) wherein (R) is alkyl which is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl; $C_{1-8}$ alkyl, wherein the alkyl is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl;

$CX_3$ where X is chlorine, fluorine or bromine;

$C_{1-8}$ alkylthio, wherein the alkyl is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl; or wherein R2 and R3, or R4 and R5, form a saturated or unsaturated homocyclic or heterocyclic five-membered or six-membered ring, optionally oxygen or an addition nitrogen as a ring member;

R6 and R7 independently of one another, are hydrogen, cyano (—CN), halogen, nitro ($NO_2$), hydroxy, linear or branched $C_{1-8}$ alkoxy (—OR) wherein (R) is alkyl which is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl; linear or branched $C_{1-8}$ alkyl, wherein the alkyl is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl;

$CX_3$ where X is chlorine, fluorine or bromine;

$C_6$-$C_{12}$ aryl, unsubstituted or substituted by $C_{1-8}$ alkyl, hydroxy (—OH), nitro ($NO_2$), cyano (—CN), halogen, $C_{6-12}$ aryl, or —NR8R9, wherein R8 and R9 are independently hydrogen, $C_{1-8}$ alkyl or $C_{6-12}$ aryl or $C_1$-$C_8$ alkoxy (—OR); or R6 and R7 can form a homocyclic six-membered ring to give a compound of formula (I) or (II) represented by formula (III) or (IV) as defined in claim 1, wherein R10-R13 independently of one another are hydrogen, cyano (—CN), halogen, nitro ($NO_2$), hydroxy, $C_{1-8}$ alkoxy (—OR) wherein (R) is alkyl which is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl; $C_{1-8}$ alkyl, wherein the alkyl is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl;

$CX_3$ where X is chlorine, fluorine or bromine;

An- is as defined in claim 1.

3. An optical layer according to claim 1, wherein
R1 is a linear or branched $C_{1-6}$ alkyl,
R2 to R5 are hydrogen,
R6 is hydrogen, cyano (—CN), halogen, nitro ($NO_2$), hydroxy, linear or branched $C_{1-8}$ alkoxy (—OR) wherein the alkyl (R) is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl;

linear or branched $C_{1-8}$ alkyl, wherein the alkyl is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl;

$CX_3$ where X is chlorine, fluorine or bromine;

$C_6$-$C_{12}$ aryl, unsubstituted or substituted by $C_{1-8}$ alkyl, hydroxy (—OH), nitro ($NO_2$), cyano (—CN), halogen, $C_{6-12}$ aryl, —NR8R9, wherein R8 and R9 are independently hydrogen, $C_{1-8}$ alkyl or $C_{6-12}$ aryl or $C_1$-$C_8$ alkoxy (—OR)

R7 is hydrogen or

R6 and R7 form a homocyclic six-membered ring to give a compound of formula (I) or (II) represented by formula (III) or (IV) as defined in claim 1, wherein R10-R13 independently of one another are hydrogen, cyano (—CN), halogen, $C_{1-8}$ alkyl, wherein the alkyl is unsubstituted or substituted by $C_{1-8}$ alkyl, hydroxy (—OH), $C_{6-12}$ aryl or —NR8R9, wherein R8 and R9 are independently hydrogen, $C_{1-8}$ alkyl or $C_{6-12}$ aryl;

An- is as defined in claim 1.

4. An optical layer according to claim 1, wherein the dye compound is of formula (I), and
R1 is a linear or branched $C_{1-6}$ alkyl
R2 to R5 are hydrogen,
R6 is hydrogen, methyl, ethyl, phenyl, 4-methoxyphenyl, tert-butyl or trifluoromethyl,
R7 is hydrogen, or
R6 and R7 form a homocyclic six-membered ring to give a compound of formula (I) represented by formula (III) as defined in claim 1, wherein R10, R12 and R13 are hydrogen and R11 is methyl or chlorine,
An- is as defined in claim 1.

5. An optical layer comprising a mixture of at least two dye compounds according to formula (I) or formula (II) as defined in claim 1.

6. A method for producing an optical layer according to claim 1, comprising the steps of
(a) providing a substrate (a),
(b) dissolving a dye compound or a mixture of dye compounds of formula (I) or (II) as defined in claim 1 in an organic solvent to form a solution (b),
(c) coating the solution (b) on the substrate (a);
(d) evaporating the solvent to form a dye layer.

7. A method according to claim 6, wherein the substrate is polycarbonate (PC) or polymethylmethacrylate (PMMA).

8. A method according to claim 6, wherein the organic solvent is selected from the group consisting of $C_{1-8}$ alcohol, halogen substituted $C_{1-8}$ alcohols, $C_{1-8}$ ketone, $C_{1-8}$ ether, halogen substituted $C_{1-4}$ alkane, and amides.

9. An optical recording medium comprising an optical layer according to claim 5.

10. An optical layer according to claim 1, wherein An- is an inorganic anion selected from the group consisting of iodine, fluorine, bromine, chlorine, perchlorate, hexafluoroantimonate, hexafluorophosphate, tetrafluoroborate and tetraphenylborate.

11. An optical layer according to claim 1, wherein An- is an organic anion selected from the group consisting of dicyanoamide ($N(CN)_2$) or trifluoromethanesulfonimide ($N(SO_2CF_3)_2$.

12. An optical layer according to claim 3, wherein An- is an inorganic anion selected from the group consisting of iodine, fluorine, bromine, chlorine, perchlorate, hexafluoroantimonate, hexafluorophosphate, tetrafluoroborate and tetraphenylborate.

13. An optical layer according to claim 3, wherein An- is an inorganic cation selected from the group consisting of iodine, chlorine, perchlorate, hexafluoroantimonate, hexafluorophosphate and tetrafluoroborate.

14. An optical recording medium comprising an optical layer according to claim 1.

15. A dye compound of formula (VI),

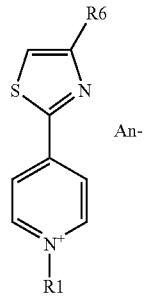

(VI)

wherein
R1 is selected from methyl, ethyl, n- and i-propyl;
R6 is methoxy or $CF_3$; and
An- is an anion counter-part selected from the group consisting of inorganic anions, organic anions and an anionic azo metal complex based on cobalt metal.

16. A dye compound of formula (VI) according to claim 15, wherein An- is an inorganic anion selected from the group consisting of iodine, fluorine, bromine, chlorine, perchlorate, hexafluoroantimonate, hexafluorophosphate, tetrafluoroborate and tetraphenylborate.

17. A dye compound of formula (VI) according to claim 15, wherein An- is an inorganic cation selected from the group consisting of iodine, chlorine, perchlorate, hexafluoroantimonate, hexafluorophosphate and tetrafluoroborate.

18. A dye compound of formula (VIII),

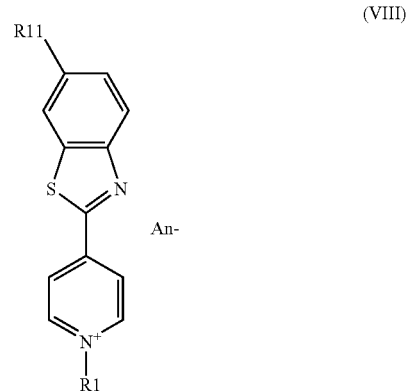

(VIII)

wherein
R1 is selected from methyl, ethyl, n- or i-propyl;
R11 is cyano;
An- is an anion counter-part selected from the group consisting of inorganic anions, organic anions and an anionic azo metal complex based on cobalt metal.

19. A dye compound of formula (VIII), according to claim 18, wherein An- is an inorganic anion selected from the group consisting of iodine, fluorine, bromine, chlorine, perchlorate, hexafluoroantimonate, hexafluorophosphate, tetrafluoroborate and tetraphenylborate.

20. A dye compound of formula (VIII), according to claim 18, wherein An- is an inorganic cation selected from the group consisting of iodine, chlorine, perchlorate, hexafluoroantimonate, hexafluorophosphate and tetrafluoroborate.

* * * * *